Oct. 18, 1960  F. J. BROWN ET AL  2,956,664
EJECTOR MECHANISMS
Filed Sept. 26, 1958

INVENTORS
F. J. BROWN
F. RADAKOVICH
BY R. P. Miller
ATTORNEY

United States Patent Office 2,956,664
Patented Oct. 18, 1960

2,956,664

EJECTOR MECHANISMS

Ford J. Brown, Tinley Park, and Fred Radakovich, Chicago, Ill., assignors to Western Electric Company, Incorporated, New York, N.Y., a corporation of New York Filed Sept. 26, 1958, Ser. No. 763,723

5 Claims. (Cl. 198—22)

This invetion relates to ejector mechanisms and more particularly to ejector mechanisms suitable for removing annular work pieces from a rotary indexing table of an article working machine.

Multi-station machines are frequently utilized when it is necessary to perform multiple forming or working operations upon mass produced work pieces. In such machines, it is customary to use rotary indexing tables for transferring the work pieces between successive stations. Such tables are generally provided with recesses within which the individual work pieces are deposited and held therein during the various operations. Loading of these tables normally presents no problem since the articles are generally dropped into the receiving recesses by a simple dispensing mechanism. With certain types of work pieces, unloading also presents no problem. The articles are simply elevated above the top of the recess and then guided off the table by a deflector. However, certain types of articles, such as annular members, which require the presence of a core therein during the forming or working operations, present additional problems with respect to the unloading of the indexing table.

It is therefore a primary object of this invention to provide new and improved ejector mehcanisms.

It is another object of this invention to provide an ejector mechanism which will remove annular work pieces from rotary indexing tables.

It is a further object of this invention to provide an ejector mechanism which will remove annular members from molds formed in a rotary indexing table and subsequently desposit the annular members in a discharge chute.

With these and other objects in view, the present invention contemplates a pair of resilient fingers that are adapted to engage and hold an annular member which has been removed from a mold formed in a rotary indexing table by the upward movement of a floating core pin forming a part of the mold. A spring biased retaining pin is provided in axial alignment with the floating core pin and enters the central aperture of the annular member under the urging of the spring as the floating core pin is retracted. A suitable mechanism is provided for withdrawing the retaining pin as the table is indexed to the next position. An additional mehcanism, actuated by a button cam on the upper surface of the table, is provided to knock the annular member from between the resilient fingers and into a discharge chute once the retaining pin has been withdrawn. Both of the aforementioned mechanisms are adapted to be operated in timed relationship with the cyclic operation of the rotary indexing table.

Other objects, advantages and novel features of the invention will become apparent upon consideration of the following detailed description when taken in conjunction with the accompanying drawings wherein.

Figure 1:
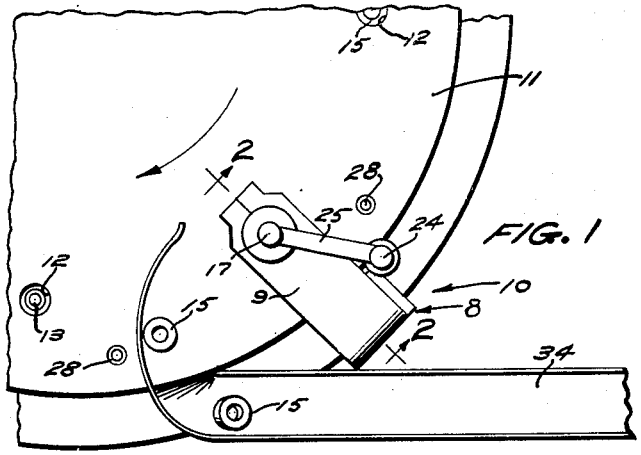
Fig. 1 is a top plan view of a preferred embodiment of the ejector mechanism of the present invention, together with a portion of a rotary indexing table with which it may be associated.
Figure 2:
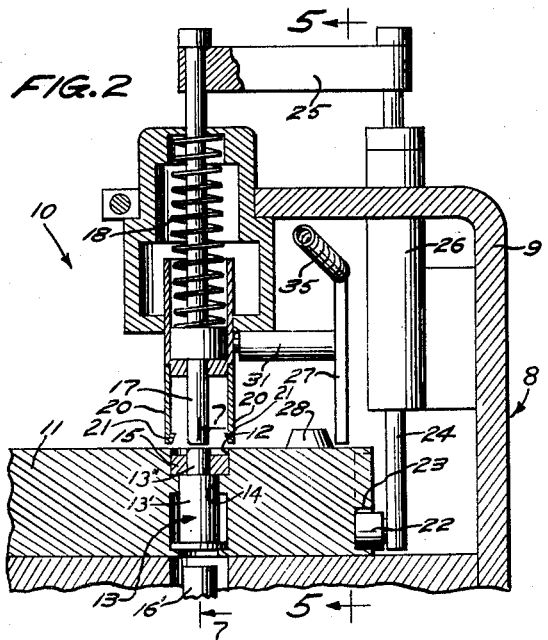
Fig. 2 is an enlarged sectional view taken along the line 2—2 of Fig. 1 and illustrates the actuator mechanism for a retaining pin.

Attention now is directed to the drawings wherein like numerals of reference designate like parts throughout the several views and wherein is disclosed an ejector mechanism, designated generally by the reference numeral 10. The ejector mechanism 10 is mounted on a fixed bracket 9 of a stationary supporting frame, designated generally by the numeral 8, for operation in assocation with a rotary indexing table 11 which has a discharge station adjacent to the mechanism 10, as viewed in Fig. 1. The table 11 is provided with a plurality of circular mold cavities 12, within each of which is received an annular article, such as a loading coil core ring 15 formed of a permalloy powder which has been compacted into a unitary mass within the cavity 12 by means of a hydraulic ram (not shown). The cavities 12 are formed in the upper surface of the table 11, so that the core rings 15 fit closely therein below the upper surface of the table 11, as viewed in Fig. 2 showing the normal operating relationship.

A core pin, designated generally by the numeral 13, is carried for vertical sliding movement within a retaining aperture 14 formed in the table 11 below each article-receiving cavity 12. The core pin 13 is formed with a cylindrical body portion 13' intermediate in diameter between the hole in the core ring 15 and the outer diameter of the core ring. As illustrated in Fig. 2, the core pin 13 is normally positioned by gravity so that the body portion 13' is just below the core ring 15 to serve as a seat therefor.

The core pin 13 is further provided with a tip 13'' projecting upward from the body portion and of a diameter slightly less than that of the hole in the core ring. As shown in Fig. 2, the tip 13'' is normally flush with the upper surface of the table 11 and serves as a center for the core ring 15.

Figure 7:
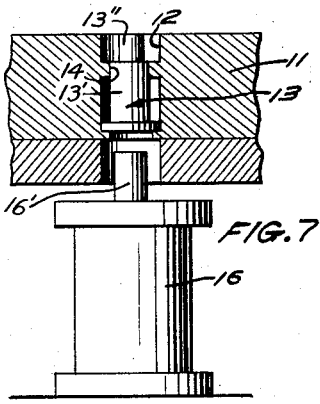
Fig. 7 is a view taken along the line 7—7 of Fig. 2 and illustrates a hydraulic cylinder which is used to elevate the floating core pin.
Figure 3:
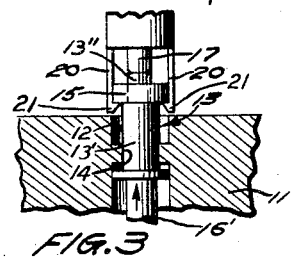
Fig. 3 is a fragmentary sectional view illustrating the manner in which a floating core pin is elevated to deposit an annular member between the resilient fingers.

Each time the table 11 has been indexed to bring a core ring 15 to a rest position beneath the ejector mechanism 10, a hydraulic cylinder 16 (Fig. 7) is actuated so that a piston rod 16' thereof moves upward to engage the bottom of the core pin 13 to move the core pin 13 and core ring 15 upward, thus positively lifting the core ring 15 out of the close-fitting cavity 12, as illustrated in Fig. 3. As the pin 13 moves upward, the upper surface of the tip 13 engages the under surface of a retaining pin 17 and forces the pin 17 upward against the urging of a compression spring 18 (Fig. 2). When the pin 13 has reached the upper limit of its movement, the core ring 15 is inserted between a pair of resilient, parallel gripping fingers 20 (Fig. 3). As indicated in Fig. 2, the fingers 20 are mounted vertically on the bracket 9 of the frame 8 above the table 11 in such positions that the inner edges of the fingers 20 are in vertical alignment with the outer edges of the core ring 15 carried in the cavities 12 of the table 11 after the table has been indexed to the discharge station. As illustrated, each of the fingers 20 is formed with an inwardly extending detent 21 near the lower end thereof.

Figure 4:
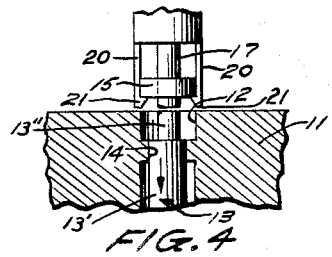
Fig. 4 is a view similar to Fig. 3 in which the floating core pin has been retracted and the retaining pin permitted to enter the central aperture of the annular work piece.

As the core pin 13 pushes the core ring 15 upward, the ring 15 strikes the opposing detents 21 to spread the resilient fingers 20 apart a sufficient distance to permit the core ring 15 to pass the detents 21 and become lodged between the fingers 20. The fingers 20 then spring back so as to grip the core ring 15 from opposite sides thereof to hold the same away from the table 11. The core ring 15 is retained vertically on flat upper surfaces of the detents 21, as shown in Fig. 4. When the piston rod 16' is subsequently retracted, the retaining pin 17 moves downward under the urging of the spring 18 and enters the central aperture in the core ring 15 to retain the core ring within the grip of the fingers 20 (Fig. 4) and to force the core pin 13 back to its starting position. It should be noted that, in the normal position (Figs. 2 and 4), the bottom of the retaining pin 17 is approximately flush with the lower edges of the fingers 20 in order to support the core ring 15 fully and insure that the core pin 13 is fully ejected therefrom.

As the table 11 begins the next indexing movement, a follower roller 22 (Fig. 2), positioned in a cam groove 23 formed in the periphery of the table 11, elevates a retractor rod 24 slidably mounted in a sleeve 26 attached to the bracket 9. Upward movement of the rod 24 elevates an arm 25, one extremity of which is secured to the top thereof. The upper extremity of the retaining pin 17 is connected to the other extremity of the arm 25 so that upward movement of the arm 25 serves to withdraw the lower extremity of the retaining pin 17 from within the central aperture of the core ring 15.

Figure 5:
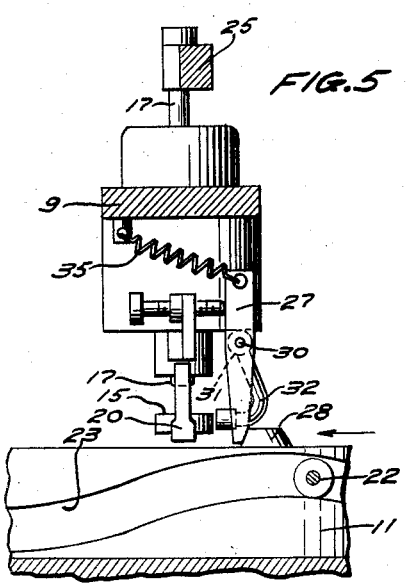
Fig. 5 is a sectional view taken along the line 5—5 of Fig. 2 and illustrates the mechanism which is utilized to knock the work piece from the grip of the resilient fingers and into a discharge chute.
Figure 6:
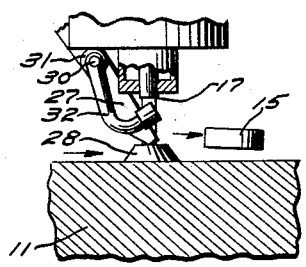
Fig. 6 is a fragmentary sectional view of opposite hand illustrating the mechanism of Fig. 5 in the actuated position.

Shortly after the pin 17 has been completely withdrawn from within the core ring 15, a follower arm 27 (Fig. 5) engages a button cam 28 which is secured to the upper surface of the table 11. The follower arm 27 is rigidly secured to a shaft 30 which is rotatable within a sleeve 31. As the table 11 continues its indexing movement, the button cam 28 causes the follower arm 27 to pivot in a clockwise direction about the axis of the shaft 30. This causes an ejector arm 32, which is also rigidly secured to the shaft 30, to move in the same direction with a rapid movement and knock the formed core ring 15 out from between the resilient fingers 20 (Fig. 6) and into a discharge chute 34 (Fig. 1). After the follower arm 27 has cleared the button cam 28, a spring 35 returns the arms 27 and 32 to the position shown in Fig. 5 in a condition of readiness for ejection of the next core ring 15. At the same time, the cam groove 23 causes the retractor rod 24 to be lowered to return the retaining pin 17 to the position shown in Fig. 2 in preparation for the next cycle.

Thus, it can be seen that simple mechanism has been provided which will rapidly remove annular work pieces from close-fitting cavities in rotary indexing tables and eject them into a discharge chute. It is to be understood, however, that the above-described arrangements are simply illustrative of the application of the principles of this invention. Numerous other arrangements may be readily devised by those skilled in the art in order to accommodate work pieces which are neither apertured nor circular in configuration by utilizing the teachings of the present invention. Such modifications would, of course, embody the principles of the invention and thus fall within the spirit and scope thereof.

What is claimed is:

1. Apparatus for removing a succession of annular articles from within a succession of close-fitting, circular, article-receiving cavities formed in the upper surface of a horizontal, indexing work table, which apparatus comprises a pair of resilient gripping fingers mounted stationarily above the table and in alignment with the outer edges of the article carried by the table after the table has been indexed to a discharge station; means, movable upward through an aperture in the bottom of the table and operated after the table has been indexed to the discharge station, for lifting the article out of the cavity in the table and then inserting the article between said gripping fingers, at which time said fingers grip the article from opposite sides thereof to hold the same away from the table; means for retracting said lifting means; and means actuated after the start of the next indexing movement of the table for knocking the article out from between said fingers.

2. Apparatus for removing a succession of annular articles from within a succession of close-fitting, circular, article-receiving cavities formed in the upper surface of a horizontal, rotary, indexing work table, which apparatus comprises a supporting frame; a pair of resilient, parallel gripping fingers mounted vertically on said frame above the table in such positions that said fingers are in vertical alignment with the outer edges of the article carried by the table after the table has been indexed to a discharge station, each finger having an inwardly extending detent near the lower end thereof; means, movable upward through an aperture in the bottom of the table and operated after the table has been indexed to the discharge station, for lifting the article out of the cavity in the table and then inserting the article between said gripping fingers, the article striking the opposing detents to spread the resilient fingers apart a sufficient distance to permit the article to pass the detents and become lodged between said fingers, said fingers then springing back so as to grip the article from opposite sides thereof to hold the same away from the table; means for retracting said lifting means; and means actuated after the start of the next indexing movement of the table for knocking the article out from between said fingers.

3. Apparatus for removing a succession of annular articles from a succession of close-fitting, circular, article-receiving cavities formed in the upper surface of a horizontal, rotary, indexing work table, which apparatus comprises a plurality of core pins, each core pin being carried within a retaining aperture formed in the table below the article-receiving cavity, each core pin having a cylindrical body portion intermediate in diameter between the diameter of the hole in the annular article and the outer diameter of the article which portion is normally positioned by gravity just below the article to serve as a seat therefor, each core pin further having a tip projecting upward from the body portion and of a diameter slightly less than that of the hole in the article which tip is normally flush with the upper surface of the table to serve as a center for the article; a pair of resilient gripping fingers mounted stationarily above the table and in alignment with the outer edges of the article carried by the table after the table has been indexed to a discharge station; means operated after the table has been indexed to the discharge station for pushing upward upon the associated core pin to lift the article out of the cavity in the table and then insert the article between said gripping fingers, at which time said fingers grip the article from opposite sides thereof to hold the same away from the table; means for retracting said pushing means, whereupon said core pin moves back to its normal position; and means actuated after the start of the next indexing movement of the table for knocking the article out from between said fingers.

4. Apparatus for removing a succession of annular articles from a succession of close-fitting, circular, article-receiving cavities formed in the upper surface of a horizontal, rotary, indexing work table, which apparatus comprises a pair of resilient gripping fingers mounted stationarily above the table and in alignment with the outer edges of the article carried by the table after the table has been indexed to a discharge station; means, movable upward through an aperture in the bottom of the table and operated after the table has been indexed to the discharge station, for lifting the article out of the cavity in the table and then inserting the article between said gripping fingers, at which time said fingers grip the article from opposite sides thereof to hold the same away from the table; means for retracting said lifting means; a retaining pin mounted for vertical reciprocating movement between said fingers out of contact therewith and an axial alignment with the article held thereby; means operated as said lifting means is retracted for moving said retaining pin a predetermined distance downward through the hole in the annular article to retain the article between said fingers; means actuated after the start of the next indexing movement of the table for withdrawing said retaining pin from the hole in the article; and means actuated after said pin has been withdrawn for knocking the article out from between said fingers.

5. Apparatus for removing a succession of annular articles from a succession of close-fitting, circular, article-receiving cavities formed in the upper surface of a horizontal, rotary, indexing work table, which apparatus comprises a plurality of core pins, each core pin being carried within a retaining aperture formed in the table below the article-receiving cavity, each core pin having a cylindrical body portion intermediate in diameter between the diameter of the hole in the annular article and the outer diameter of the article which portion is normally positioned by gravity just below the article to serve as a seat therefor, each core pin further having a tip projecting upward from the body portion and of a diameter slightly less than that of the hole in the article which tip is normally flush with the upper surface of the table to serve as a center for the article; a supporting frame; a pair of resilient, parallel gripping fingers mounted vertically on said frame above the table in such position that said fingers are in vertical alignment with the outer edges of the article carried by the table after the table has been indexed to a discharge station, each finger having an inwardly extending detent near the lower end thereof; means operated after the table has been indexed to the discharge station for pushing upward upon the associated core pin to lift the article out of the cavity in the table and then insert the article between said gripping fingers, the article striking the opposing detents to spread the resilient fingers apart a sufficient distance to permit the article to pass the detents and become lodged between said fingers, said fingers then springing back so as to grip the article from opposite sides thereof to hold the same away from the table; means for retracting said pushing means, whereupon said core pin moves back to its normal position; a retaining pin mounted for vertical reciprocating movement between said fingers out of contact therewith and in axial alignment with the article held thereby; resilient means for biasing said retaining pin downward to a normal position approximately flush with the lower edges of said gripping fingers, the elevation of said core pin serving to push said retaining pin upward against the action of said biasing means as the article is inserted between said fingers, said biasing means then forcing said retaining pin downward through the hole in the article to retain the article between said fingers and to force said core pin back to its normal position; means actuated after the start of the next indexing movement of the table for withdrawing said retaining pin from the hole in the article against the action of said biasing means; and means actuated after said pin has been withdrawn for knocking the article out from between said fingers.

References Cited in the file of this patent

UNITED STATES PATENTS

| | | |
|---|---|---|
| 2,025,939 | Burns | Dec. 31, 1935 |
| 2,863,579 | Meyer | Dec. 9, 1958 |